F. HIMMEL ET AL

Feb. 28, 1933. STORE FRONT CONSTRUCTION Re. 18,753

Original Filed April 2, 1931

Inventors
Fred Himmel
Isidore Himmel
by Seymour Earle Nichols
Attys

Reissued Feb. 28, 1933

Re. 18,753

UNITED STATES PATENT OFFICE

FRED HIMMEL AND ISIDORE HIMMEL, OF NEW HAVEN, CONNECTICUT, ASSIGNORS TO THE HIMMEL BROTHERS COMPANY, OF NEW HAVEN, CONNECTICUT, A CORPORATION

STORE-FRONT CONSTRUCTION

Original No. 1,849,525, dated March 15, 1932, Serial No. 527,210, filed April 2, 1931. Application for reissue filed January 19, 1933. Serial No. 652,540.

This invention relates to an improvement in store-front constructions and is similar in operation to the device shown and described in Letters Patent of the United States, No. 1,784,689, granted December 9, 1930, on an application filed by us.

The object is to provide simple means for firmly uniting the inner and outer members for store-front constructions, and the invention consists in the construction as hereinafter described and particularly recited in the claims.

Figure 1:
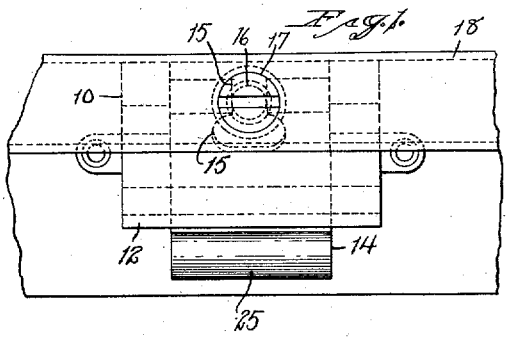
Fig. 1 is a plan view illustrating a store-front construction embodying our invention, with the front member removed.
Figure 3:
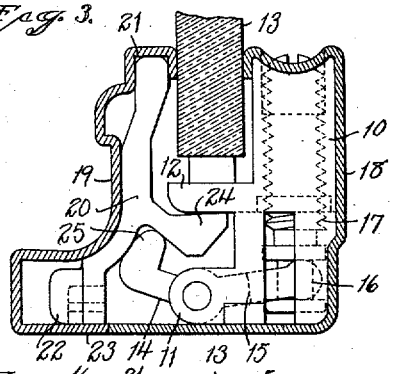
Fig. 3 is an end view of the same.
Figure 2:
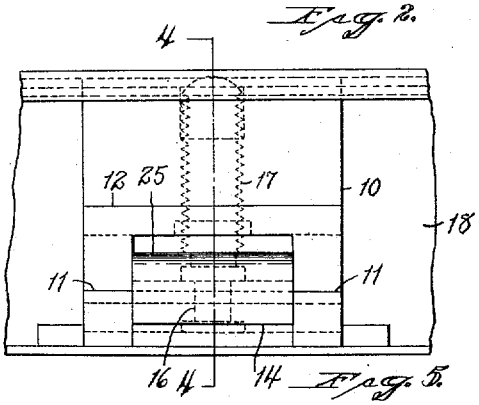
Fig. 2 is a front view of the same.
Figure 4:
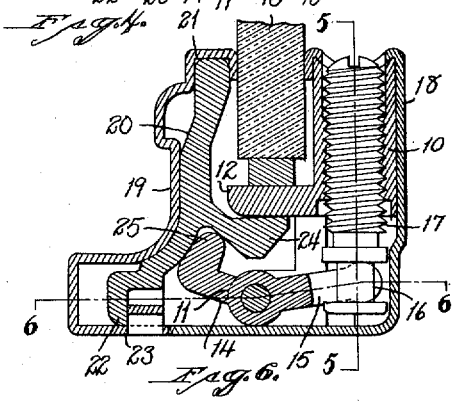
Fig. 4 is a sectional view taken on the line 4—4 of Fig. 2.
Figure 5:
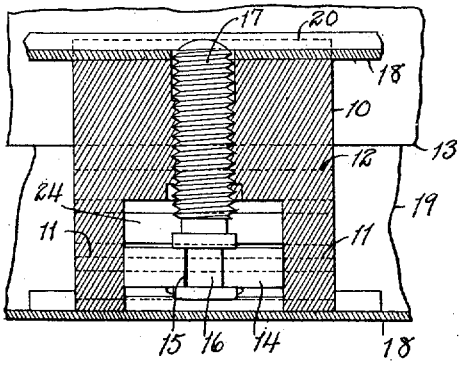
Fig. 5 is a sectional view taken on the line 5—5 of Fig. 4.
Figure 6:
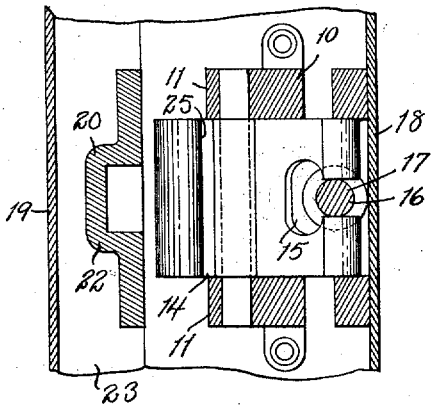
Fig. 6 is a sectional view taken on the line 6—6 of Fig. 4.
Figure 8:
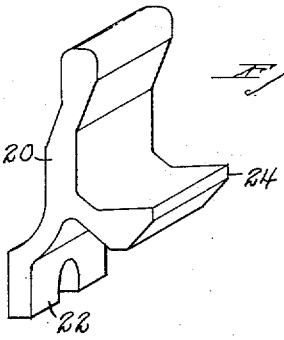
Fig. 8 is a perspective view of the coupler detached.
Figure 7:
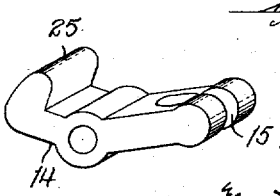
Fig. 7 is a perspective view of the rocker detached.

In carrying out our invention, we employ a housing-block 10 similar to that shown in Patent No. 1,849,524, dated March 15, 1932, that is, it is provided with trunnions 11 and a shelf 12 on which a sheet of glass 13 may be supported.

Between the trunnions a rocker 14 is pivoted, the inner end of the rocker having a slot 15 to pass on opposite sides of a neck 16 of a screw 17, which is mounted in the housing-block and extends upward through the top of the inner member 18.

Mounted in the outer member 19 is a coupler 20, the upper end extending into a groove 21 at the outer edge of the outer member and its lower end 22 interlocked with the bottom-wall 23 of the outer member. This coupler is formed with an inwardly-extending cam-rib 24 to be engaged by the outer end 25 of the rocker 14 and so that when the inner end of the rocker is forced downward, the coupler will be drawn inward and force the outer member into engagement with the glass.

These blocks and couplers are located at regularly-spaced intervals in the inner and outer strips and the cam-ribs 24 are so wide that if the couplers and blocks do not exactly align, they will still be in cooperative position, and the top of the rib engaging with the under-side of the shelf 12 prevents the outer member from riding upward and any movement of the rocker necessarily draws the outer member against the glass. The rocker, being in engagement with the screw, is positively moved in either direction.

We claim:

1. A store-front construction comprising inner and outer members, a housing-block mounted in the inner member, a screw extending downward through said block, said screw formed with a neck, a rocker pivotally mounted in the housing-block and having one end extending rearward and notched for engagement with the neck of the said screw, and a coupler mounted in the outer member and formed with a forwardly-projecting cam-rib extending into the path of the forward end of the said rocker, whereby the movement of the rocker draws the two said members together.

2. A store-front construction comprising inner and outer members, a housing-block fixed in position in the inner member, said housing-block formed with forwardly-projecting trunnions and a forwardly-projecting shelf, a rocker pivotally connected with said trunnions and formed at its inner end with a notch, a screw vertically movable in the mounting-block and coupled with the notched inner end of the rocker, and a coupler fixed in the outer member and formed with a forwardly-projecting cam-rib engaging the underside of said shelf, the under-face of the rib extending over and in engagement with the forward end of the rocker.

3. A store-front construction comprising inner and outer members, a housing-block mounted in the inner member, a screw extending downward through said block, said screw formed with a neck, a pivotal rocker adapted to draw the two members together, the inner end of the said rocker extending into engagement with the neck of the screw, whereby the rocker may be positively moved in either direction.

In testimony whereof, we have signed this specification.

FRED HIMMEL.
ISIDORE HIMMEL.